July 29, 1924.  1,503,428
E. MORTERUD
APPARATUS FOR TRANSMITTING HEAT FROM ONE LIQUID TO ANOTHER
Filed March 28, 1921
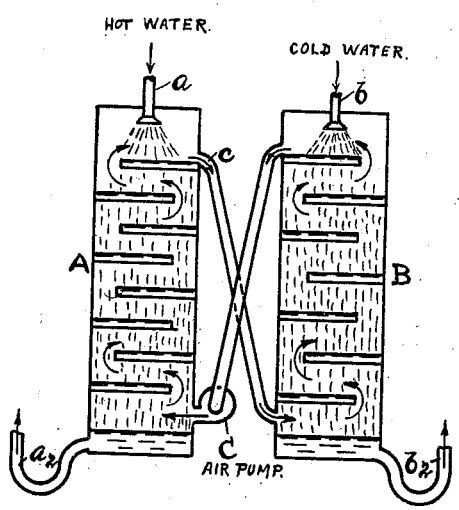
Inventor.
Einar Morterud.
By [signature]
Att.

Patented July 29, 1924.

1,503,428

UNITED STATES PATENT OFFICE.

EINAR MORTERUD, OF CHRISTIANIA, NORWAY.

APPARATUS FOR TRANSMITTING HEAT FROM ONE LIQUID TO ANOTHER.

Application filed March 28, 1921. Serial No. 456,140.

*To all whom it may concern:*

Be it known that I, EINAR MORTERUD, a subject of the King of Norway, residing at Christiania, Norway, have invented certain new and useful Improvements in Apparatus for Transmitting Heat from One Liquid to Another; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

It frequently occurs that an impure liquid which has been used or treated for some purpose is dischaged in a hot condition at the same time as it is desired to have a pure liquid heated.

It is well known to transmit the heat from an escaping liquid to a fresh quantity of liquid through a wall according to the counter current principle.

Such an arrangement however involves an expensive apparatus if it is desired to transmit a considerable percentage of heat. If the temperature differences are quite small large heating surfaces must be employed. In addition a deposit will after some time be formed upon the heating surfaces. According to the present invention an improved result is attained by the use of a current of air or other gas, which effects aeration of the impure liquid having an opposite direction of flow. The gas takes up heat partly by becoming heated itself and partly in the form of vapour, in that it will have a tendency to become saturated with moisture. Finally the gas will attain the temperature of the ingoing liquid and be saturated with moisture when it has passed through a sufficiently finely divided spray of the liquid, and when in another apparatus for example a tower at the bottom of which it is introduced it meets with a similar finely divided spray of water or other liquid to be heated, flowing in an opposite direction from the top of the tower it will gradually become cooled giving off its own heat as well as the heat of the condensed moisture.

A plant which may be used for carrying the invention into effect is diagrammatically illustrated in the accompanying drawing. In the illustrated example the impure water or other liquid is supplied at the top of the tower A and descends in stages in counter current to air which is moved by means of the blower C. The air takes up heat and is conveyed through pipes $c$ to the bottom of the tower B in which it meets with a counter current of pure water (or other liquid). From the top of the tower B the air which has been cooled and substantially freed from vapour is conveyed to the fan C to repeat its cycle of operations. Impure water is discharged at $a_2$ and pure water at $b_2$.

The described method of transmitting heat by means of a circulating current of air involves no losses of heat from the air. By means of a finely divided spray the temperature of the hot water can be actually brought down to the temperature of the incoming cold water so that it is possible to attain a very high degree of efficiency.

Claims:

1. An apparatus for transmitting heat from one body of liquid to another, comprising means for causing a relatively cold gas to pass in direct contact with a counter current of hot liquid, and means to cause the gas so heated to pass in direct contact with a counter current of cold liquid.

2. An apparatus for transmitting heat from one body of liquid to another, comprising means for maintaining a closed circuit of heat interchanging gas, and means to heat said gas in one portion of its circuit by passing the gas in direct contact with a counter current of hot liquid, and means to abstract heat from said gas in another portion of its circuit by subsequently passing the heated gas in direct contact with a counter current of liquid to be heated.

3. An apparatus for transmitting heat from one body of liquid to another body of liquid by means of a current of gas, comprising two chambers, means for introducing a spray of hot liquid through the top of one chamber, means for introducing a spray of cold liquid through the top of the other chamber, means for introducing a body of relatively cool gas directly into contact with the spray at the bottom of the chamber containing the hot spray, thereby heating said gas, and means for withdrawing the heated gas from the top of the last named chamber and introducing it into the bottom of the chamber containing the cold spray, thereby heating the liquid in the latter.

In testimony that I claim the foregoing as my invention, I have signed my name in presence of two subscribing witnesses.

EINAR MORTERUD.

Witnesses:
MORRIS GINTZLER,
JORDAN S. TUCKER.